US005867174A

United States Patent [19]
Aoki et al.

[11] Patent Number: 5,867,174
[45] Date of Patent: Feb. 2, 1999

[54] CHARACTER/SYMBOL GENERATING DEVICE FOR GENERATING CHARACTER/SYMBOL WITH A DESIRED LINE THICKNESS

[75] Inventors: Kazuma Aoki, Kasugai; Naoyuki Kawamoto, Tajimi, both of Japan

[73] Assignee: Brother Kogyo Kabushiki Kaisha, Nagoya, Japan

[21] Appl. No.: 19,886

[22] Filed: Feb. 19, 1993

[30] Foreign Application Priority Data

Feb. 19, 1992 [JP] Japan .................................. 4-32183

[51] Int. Cl.$^6$ ........................................ G06T 11/00
[52] U.S. Cl. ................................................ 345/472
[58] Field of Search ............................ 395/150, 151, 395/167–172; 345/143, 467–472; 382/55

[56] References Cited

U.S. PATENT DOCUMENTS

| | | | |
|---|---|---|---|
| 4,933,866 | 6/1990 | Markoff et al. | 395/150 |
| 5,105,471 | 4/1992 | Yoshida et al. | 382/55 |
| 5,155,805 | 10/1992 | Kaasila | 395/150 |
| 5,185,818 | 2/1993 | Warnock | 395/150 |
| 5,257,016 | 10/1993 | Fujii et al. | 345/143 |
| 5,280,576 | 1/1994 | Cao | 395/150 |
| 5,398,311 | 3/1995 | Seto | 395/151 |

*Primary Examiner*—Joseph R. Burwell
*Attorney, Agent, or Firm*—Oliff & Berridge, PLC

[57] ABSTRACT

Two types of outline font data defining thin and thick line characters belonging to the same font category are stored in a character ROM. Intermediate line characters of the same font category are generated based on the data stored in the character ROM without need for fixedly determining an order of arrangement of a plurality of pieces of data making up the character.

18 Claims, 10 Drawing Sheets

FIG. 10

| | 101 | 102 | 103 | 104 | 105 |
|---|---|---|---|---|---|
| No. 1 | S | $x_{00}$ | $y_{00}$ | 1 | No. 2 ADDRESS |
| No. 2 | B1 | $x_{01}$ | $y_{01}$ | 0 | No. 3 ADDRESS |
| No. 3 | B2 | $x_{02}$ | $y_{02}$ | 0 | No. 4 ADDRESS |
| No. 4 | B | $x_{03}$ | $y_{03}$ | 0 | No. 5 ADDRESS |
| No. 5 | L | $x_{04}$ | $y_{04}$ | 0 | No. 6 ADDRESS |
| No. 6 | B1 | $x_{05}$ | $y_{05}$ | 0 | No. 7 ADDRESS |
| No. 7 | B2 | $x_{06}$ | $y_{06}$ | 0 | No. 8 ADDRESS |
| No. 8 | B | $x_{07}$ | $y_{07}$ | 0 | No. 9 ADDRESS |
| No. 9 | L | $x_{00}$ | $y_{00}$ | 0 | No. 1 ADDRESS |

FIG. 11

| | 111 | 112 | 113 | 114 | 115 |
|---|---|---|---|---|---|
| No. 1 | S | $x'_{00}$ | $y'_{00}$ | 0 | No. 2 ADDRESS |
| No. 2 | L | $x'_{01}$ | $y'_{01}$ | 1 | No. 3 ADDRESS |
| No. 3 | B1 | $x'_{02}$ | $y'_{02}$ | 0 | No. 4 ADDRESS |
| No. 4 | B2 | $x'_{03}$ | $y'_{03}$ | 0 | No. 5 ADDRESS |
| No. 5 | B | $x'_{04}$ | $y'_{04}$ | 0 | No. 6 ADDRESS |
| No. 6 | L | $x'_{05}$ | $y'_{05}$ | 0 | No. 7 ADDRESS |
| No. 7 | B1 | $x'_{06}$ | $y'_{06}$ | 0 | No. 8 ADDRESS |
| No. 8 | B2 | $x'_{07}$ | $y'_{07}$ | 0 | No. 9 ADDRESS |
| No. 9 | B | $x'_{00}$ | $y'_{00}$ | 0 | No. 1 ADDRESS |

CHARACTER/SYMBOL GENERATING DEVICE FOR GENERATING CHARACTER/SYMBOL WITH A DESIRED LINE THICKNESS

BACKGROUND OF THE INVENTION

1. Field of the Invention

The present invention relates generally to character/symbol generating devices, and more particularly to a character/symbol generating device capable of generating characters and symbols with a desired line thickness based on character/symbol data of the same font category but of different line thickness.

2. Description of the Related Art

Character/symbol generating devices encompass printers, display units and the like. As is well known in the art, characters of various kinds of font are generally usable in such devices. Typically, one font has several different families. Only line width or line thickness of segmental lines making up each character or symbol (for the sake of simplicity, referred to as "character" hereinafter) is different in the respective families of the same font. For example, a serif font like Times Roman and sans-serif font like Helvetica are of different kind. Times Roman can be classified into slender Times, normal Times and bold Times which are the families of Times Roman but the thickness of the line segments of the character in these families are different.

Conventionally, character/symbol generating devices are supplied with fonts of different families individually, so a large capacity memory is needed to load these font families. It is possible for the character/symbol generating devices to reduce the number of font families to be loaded by producing desired intermediate line thickness characters based on slender and bold characters using interpolation technique. Only the slender and bold character families suffice to load in the character/symbol generating devices, whereby characters of desired line thickness are generated.

However, there are problems in performing the interpolation technique in that arrangement order of pieces of data for the same character in slender and bold families must be fixedly determined in advance so that the corresponding points or parts of the two family characters can be identified from the order of the data arrangement. This is because different font families do not have intercommunicating information that identifies the corresponding points or parts of the different font family characters. Therefore, if it is attempted to produce additional fonts from the minimum number of family fonts, it is necessary to process separately developed family fonts and rearrange the order of pieces of data. If the arrangement order of the pieces of data provides an information when reconstructing the character, rearrangement of the order cannot be done.

SUMMARY OF THE INVENTION

The present invention has been made to solve the above-noted problem, and accordingly it is an object of the invention to provide a character/symbol generating device wherein various kinds of fonts and their family fonts are available with a memory of reduced capacity no matter how the arrangement of the pieces of data defining a character may be.

To achieve the above and other objects, there is provided a character/symbol generating device which includes character storage means for storing first character shape data, second character shape data and intercommunication data. The first character shape data specifies a first shape of a character or a symbol, and the second character shape data specifies a second shape of the same character or the same symbol. The first and second shapes of the same character or the same symbol have corresponding points. The intercommunication data intercommunicates between the corresponding points of the first and second shapes. There is further provided means for reading the corresponding points from the first character shape data and the second character shape data using the intercommunication data. There is provided means for computing an intermediate point between the corresponding points read by the reading means. Third character shape data are thus generated which represent a third shape of the same character defined by the intermediate point.

BRIEF DESCRIPTION OF THE DRAWINGS

The particular features and advantages of the invention as well as other objects will become apparent from the following description taken in connection with the accompanying drawings, in which:

FIG. 10 is a conceptional diagram of thin point data;

FIG. 11 is a conceptional diagram of thick point data;

DETAILED DESCRIPTION OF THE PREFERRED EMBODIMENTS

A preferred embodiment of the present invention will be described with reference to the accompanying drawings. The invention is embodied to an outline font processing section of a laser printer. In the following description, it is assumed that the laser printer of the invention is capable of printing with Times Roman family typefaces and Helvetica family typefaces in accordance with an instruction fed from an external device.

Figure 1:
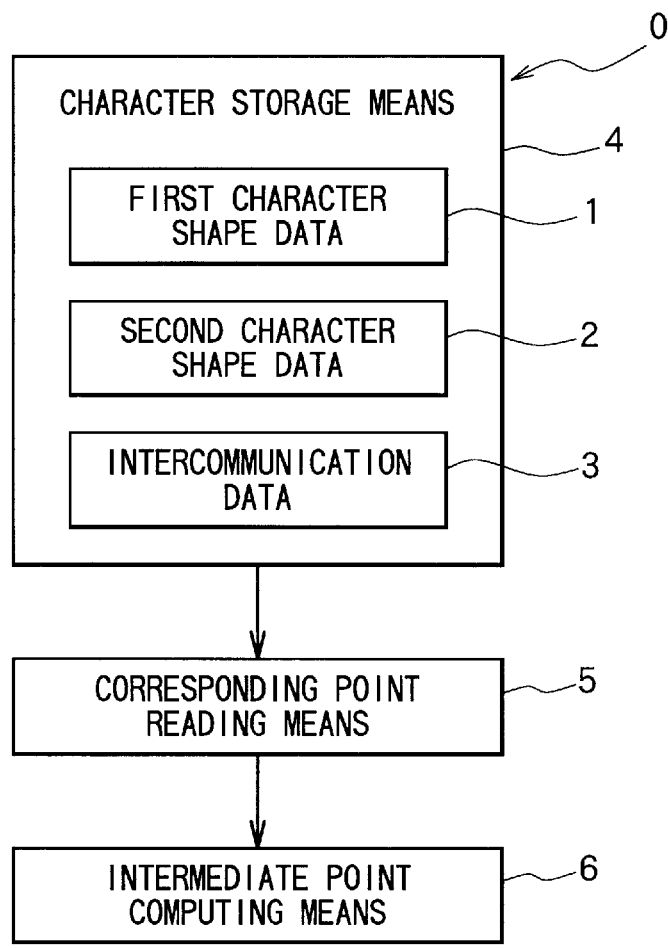
FIG. 1 is a block diagram illustrating an arrangement of the present invention.
Figure 2:
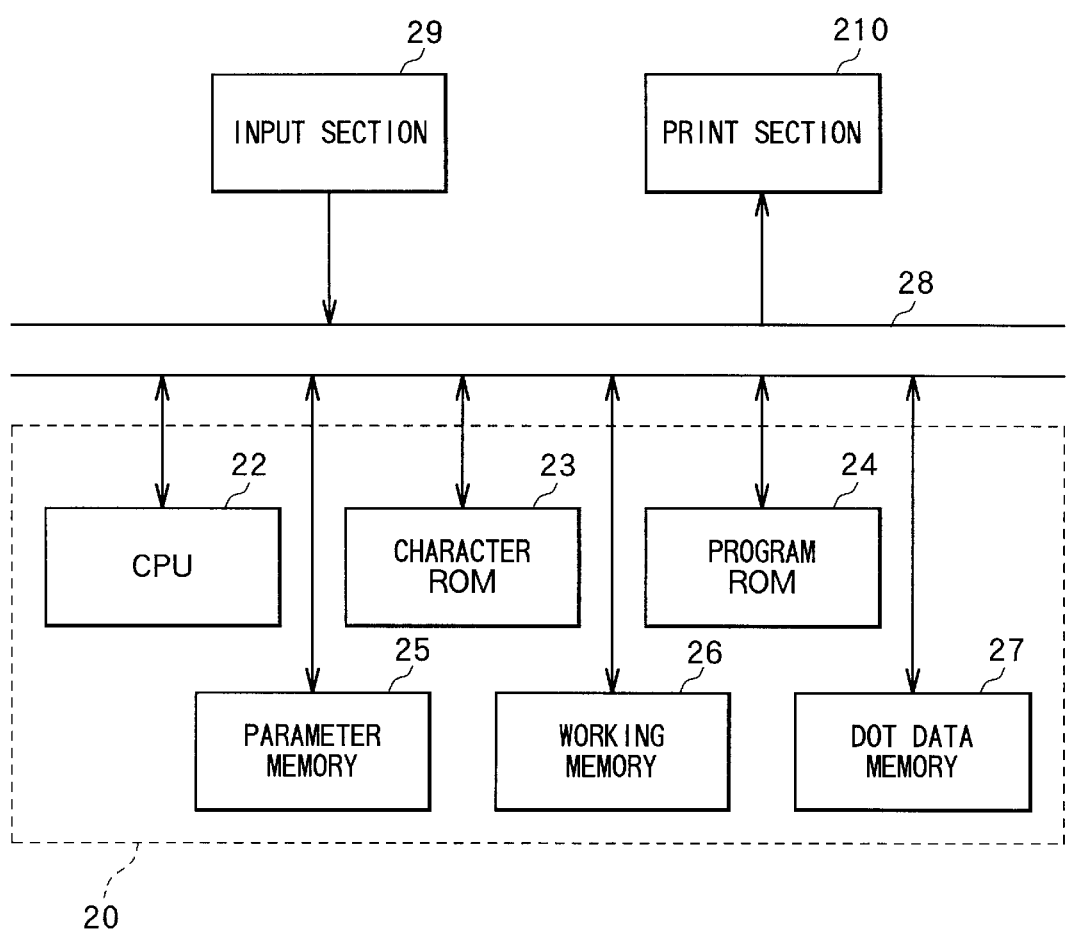
FIG. 2 is a block diagram illustrating an arrangement of a microcomputer used in an embodiment of the present invention.

FIG. 2 shows a part of a laser printer control circuit for converting outline font data into dot data. A microcomputer 20 is a primary component of the control circuit and includes a CPU 22, a character ROM 23, a program ROM 24, a parameter memory 25, a working memory 26, and a dot data memory 27 which are interconnected with one another via bus 28. An input section 29 and a print section 210 are also connected to the bus 28. The CPU 22 performs jobs in accordance with a program. The character ROM 23 stores base data for the Times Roman (serif) and Helvetica (sans-serif) family typefaces. The storage format for such data will be explained later. The program ROM 24 stores a program for developing desired character/symbol data into printable data format. The parameter memory 25 stores character codes, fonts, character sizes, weights which are parameters for determining line widths of characters, oblique angles and rotational angles. The working memory 26 temporarily stores data required for executing the program. The dot data memory 27 stores printable dot data obtained as a result of conversion of the outline data. The input section 29 applies to the microcomputer 20 data for specifying character codes, fonts, character sizes, weights, oblique angles and rotational angles. The print section 210 carries out printing in accordance with dot data read from the dot data memory 27.

Figure 3:
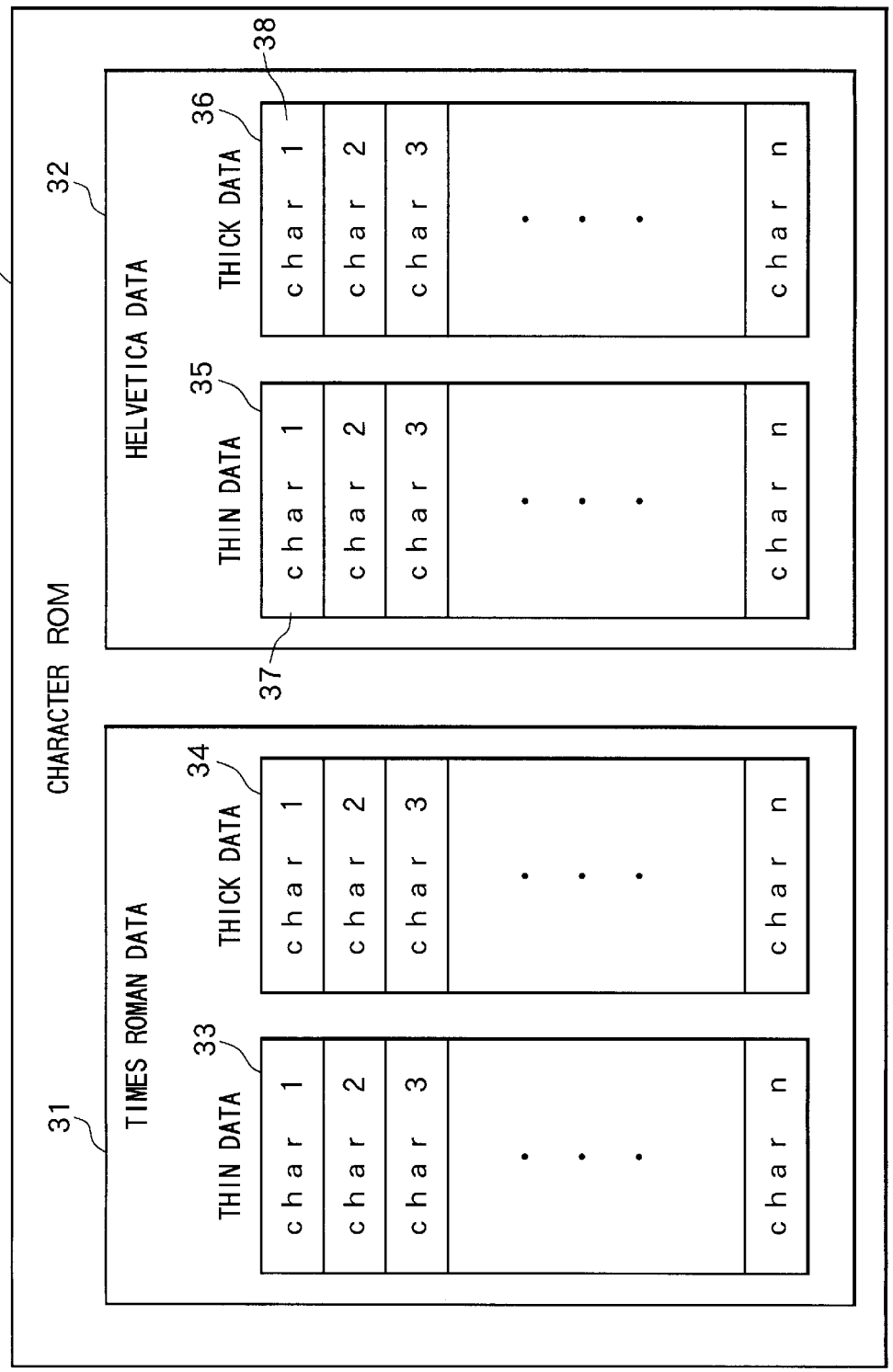
FIG. 3 is a diagram illustrating contents stored in a character ROM.

Referring to FIG. 3, the storage format of the data stored in the character ROM 23 will be described in detail.

As shown in the figure, Times Roman data 31 and Helvetica data 32 are both stored in the character ROM 23. Times Roman data 31 include thin line family data 33 and thick line family data 34. Likewise, Helvetica data 32 include thin line family data 35 and thick line family data 36. Each of the thin line family data 33, 35 and thick line family data 34, 36 includes n pieces of character data representing n-number characters and symbols.

Character data will be described in detail while referring to FIGS. 4 through 7.

Figure 4:
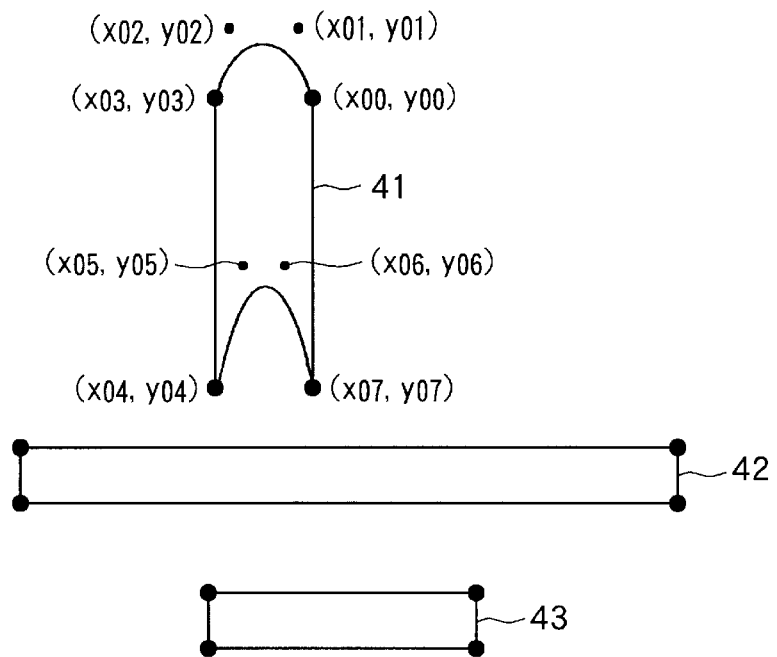
FIG. 4 is a diagram illustrating an example of thin line family data.
Figure 5:
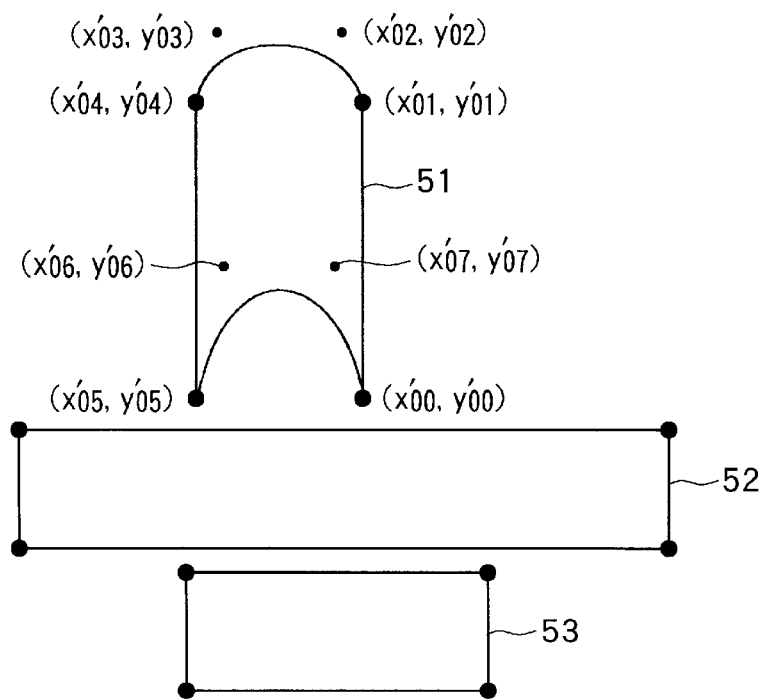
FIG. 5 is a diagram illustrating an example of thick line family data.
Figure 6:
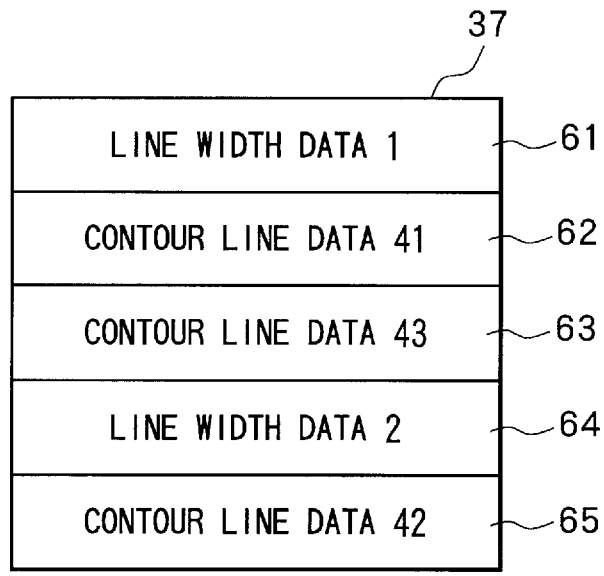
FIG. 6 is a conceptional diagram of thin character data.
Figure 7:
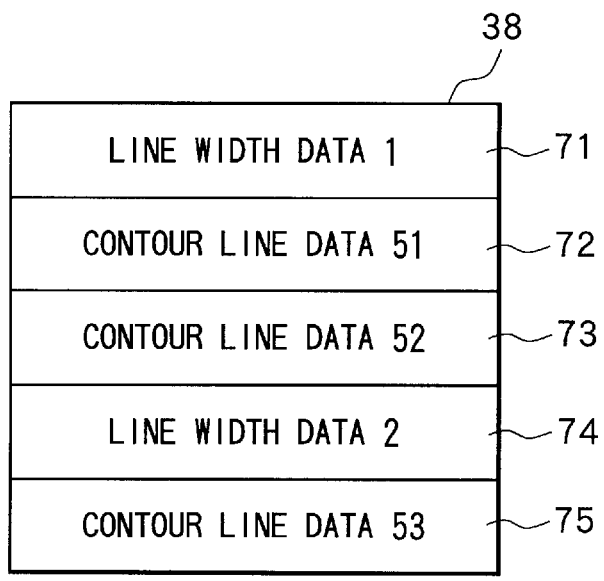
FIG. 7 is a conceptional diagram of thick character data.

FIGS. 4 and 5 show configurations of character data 37, 38 included in thin line family data 35 and thick line family data 36 of Helvetica data 32, respectively. FIGS. 6 and 7 show conceptional arrangements of character data depicted in FIGS. 4 and 5, respectively. As seen in FIGS. 6 and 7, character data are composed of line width data 61, 64 (or 71, 74) and contour line data 62, 63 and 65 (or 72, 73 and 75). Line width data represent appendant information required when outline data are converted into dot data. The appendant information is not important in understanding and practicing the invention so its further description is unnecessary. Contour line data indicate contour lines of a character. Numerals given to contour line data in FIGS. 6 and 7 correspond to the contour lines denoted by the same numerals in FIGS. 4 and 5.

Line width data contained in character data are effective only to contour line data occurring after the line width data in question but before next line width data or up to the contour line data at the end. For example, in FIG. 6, the line width data 61 in character data 37 are effective only to contour line data 62, 63 and line width data 64 are effective to contour line data 65 only. Due to line width data, the configurations of thin and thick line family data of the same character may not be identical to each other. As a result, contour line data of thin and thick line family data representing the same part of the same character may not be stored in the same order.

Figure 8:
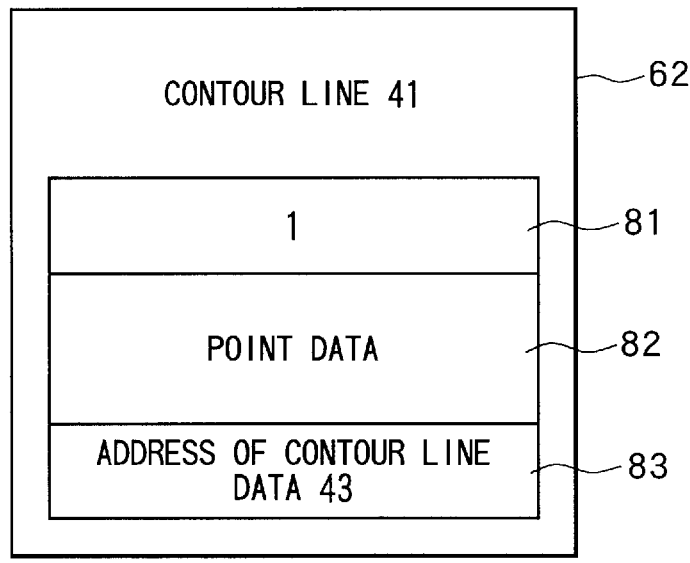
FIG. 8 is a conceptional diagram of thin contour data.
Figure 9:
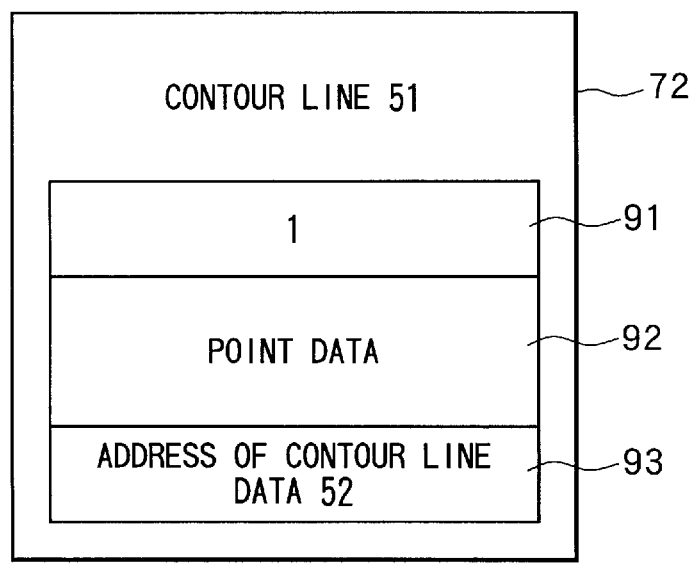
FIG. 9 is a conceptional diagram of thick contour data.

Referring next to FIGS. 4, 5, 8 and 9, contour line data will be described. Conceptional arrangements of contour line data 62 and 72 for the contour lines 41 and 51 are shown in FIGS. 8 and 9, respectively. Contour line data 62 (72) include an ID number 81 (91), point data 82 (92), and next contour line address 83 (93). The same ID number is awarded to contour line data for both thin and thick line family data representing the same segment of character contour lines. In the cases of characters depicted in FIGS. 4 and 5, contour line data 62 and 72 shown in FIGS. 6 and 7 have ID number "1", contour line data 65 and 73 have ID number "2", and contour line data 63 and 75 have ID number "3", respectively.

The next contour line address 83 (93) indicate the address where the next contour line data are stored. The next contour line address included in the lastly listed contour line data indicates the address of the leading contour line data included in the same character data. For example, in the case of FIG. 6, the next contour line address in contour line data 62 indicates the address of contour line data 65, the next contour line address in contour line data 65 indicates the address of contour line data 63, and the next contour line address In contour line data 63 indicates the address of contour line data 62.

Point data 82 (92) are data regarding straight lines and Bézier curves (hereinafter referred simply to as "curves") which make up the contour lines. FIG. 10 describes point data 82 of contour line 41 shown in FIG. 4 and FIG. 11, point data 92 of contour line 51 shown in FIG. 5. Point data includes attributes 101 (111), X-coordinate values 102 (112), Y-coordinate values 103 (113), process leading point flags 104 (114), and next point data addresses 105 (115). Requisite number of sets of these data are stored to make up the contour line.

Attribute 101 (111) represents a geometrical nature of the point in question and has such kinds as shown in Table 1 below. It should be noted that point data starts with attribute "S" at all times.

TABLE 1

| Attribute | Contents |
| --- | --- |
| S | Starting point of contour line |
| L | Terminate point of a straight line having a start point at previous point data |
| $B_1$ $B_2$ B | First control point ($B_1$), second control point ($B_2$) and terminate point (B) of a curve having a start point at previous point data, |
| * | End of contour line |
| ! | End of character data |

It should be noted that data stored in the character ROM 23 do not have attributes of "*" and "!".

X- and Y-coordinates values 102 (112) and 103 (113) represent coordinate values of the point in question.

The process leading point flag 104 (114) is set for one of a plurality of pieces of point data for each piece of contour line data. The flag is set in the same or corresponding portion of both thin and thick line family data. Setting the flag means to set logic one (1) whereas resetting the flag means to set logic zero (0). In this embodiment, for ease of processing, the process leading flag is set to the start point of a contour line, that is, to the point where the attribute is "S", with respect to thin line family data. In the examples shown in FIGS. 10 and 11, the flags have been set to points of coordinate values ($x_{00}$, $y_{00}$) and ($x'_{01}$, $Y'_{01}$). As can be apparent from FIGS. 4 and 5, these two points indicate the same portions on the same contour lines of thin and thick line family data.

The next address 105 (115) stores the leading address of the subsequent point data. The next address for the last point data included in contour line data stores the leading address of point data at the top of the same contour line data. Data regarding families of each of Times Roman and Helvetica are stored In such formats as described above.

Figure 12:
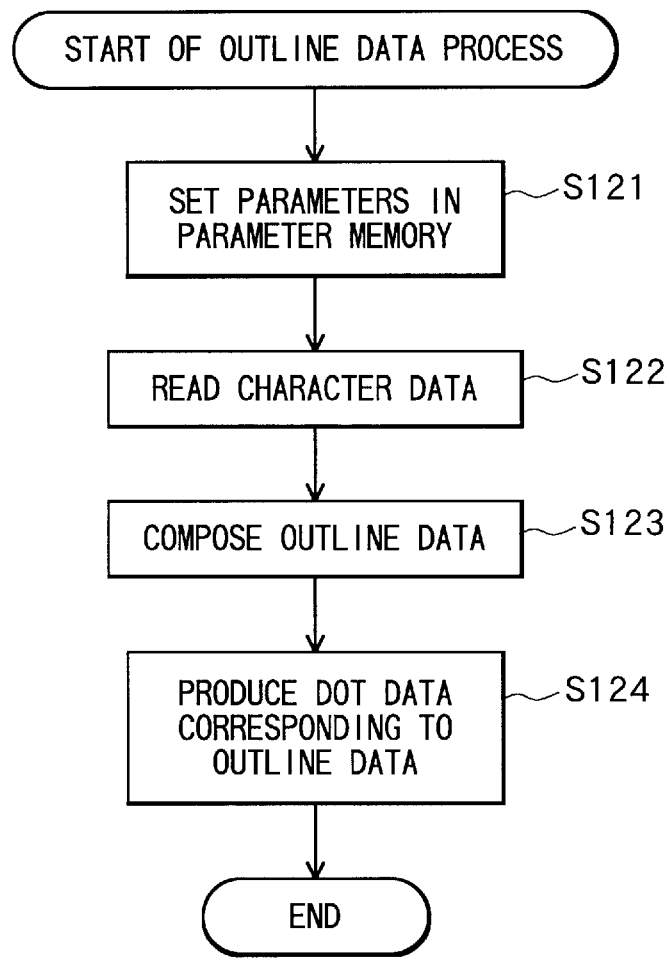
FIG. 12 is a flow chart illustrating processing executed in an outline font processing section.

Referring next to the flow chart of FIG. 12, the process executed in an outline font developing section of the laser printer will be described.

In step 121, preselected parameters are set in the parameter memory 25. The parameters include character code representative of the character to be output, font, weight, character size, oblique angle, and rotational angle. The font in interest is selected from Times Roman and Helvetica. Weight is set to provide a desired intermediate point wherein thin line family data are assumed to be 0% and thick line family data to be 100%.

Step 122 reads two pieces of character data, one from thin line family data and the other from thick line family data, corresponding to the character code and the font stored in the parameter memory. Specifically, when Helvetica is specified as the selected font, both thin and thick line family data are read corresponding to the character code. This is true for the case when Times Roman is specified.

Based on the thin and thick line family data read in step 122, outline data are composed depending on the weight set in the parameter memory and the resultant data are stored in an outline data buffer (not shown) preserved in the working memory 6, in step 123 Detailed description of this processing will be given later.

Next, in step 124, outline data composed in step 123 and stored in the outline buffer are modified depending on the information about the size, oblique angle and rotational angle stored in the parameter memory 25 and also depending on line width data included in the character data. Dot data are produced through implantation of dots inside the outline. The technique for producing the dot data is well known in the art and is not essential to the present invention, so further description thereof is unnecessary. In step 125, the dot data produced In step 124 are stored in the dot data memory 27, whereupon the process in the outline font developing section is ended.

The process of composing outline data will next be described with reference to the flow chart shown in FIG. 13. In this embodiment, since the process of line width data included in the character data is not an essential feature to the present invention, description thereof is omitted herein.

Figure 13:
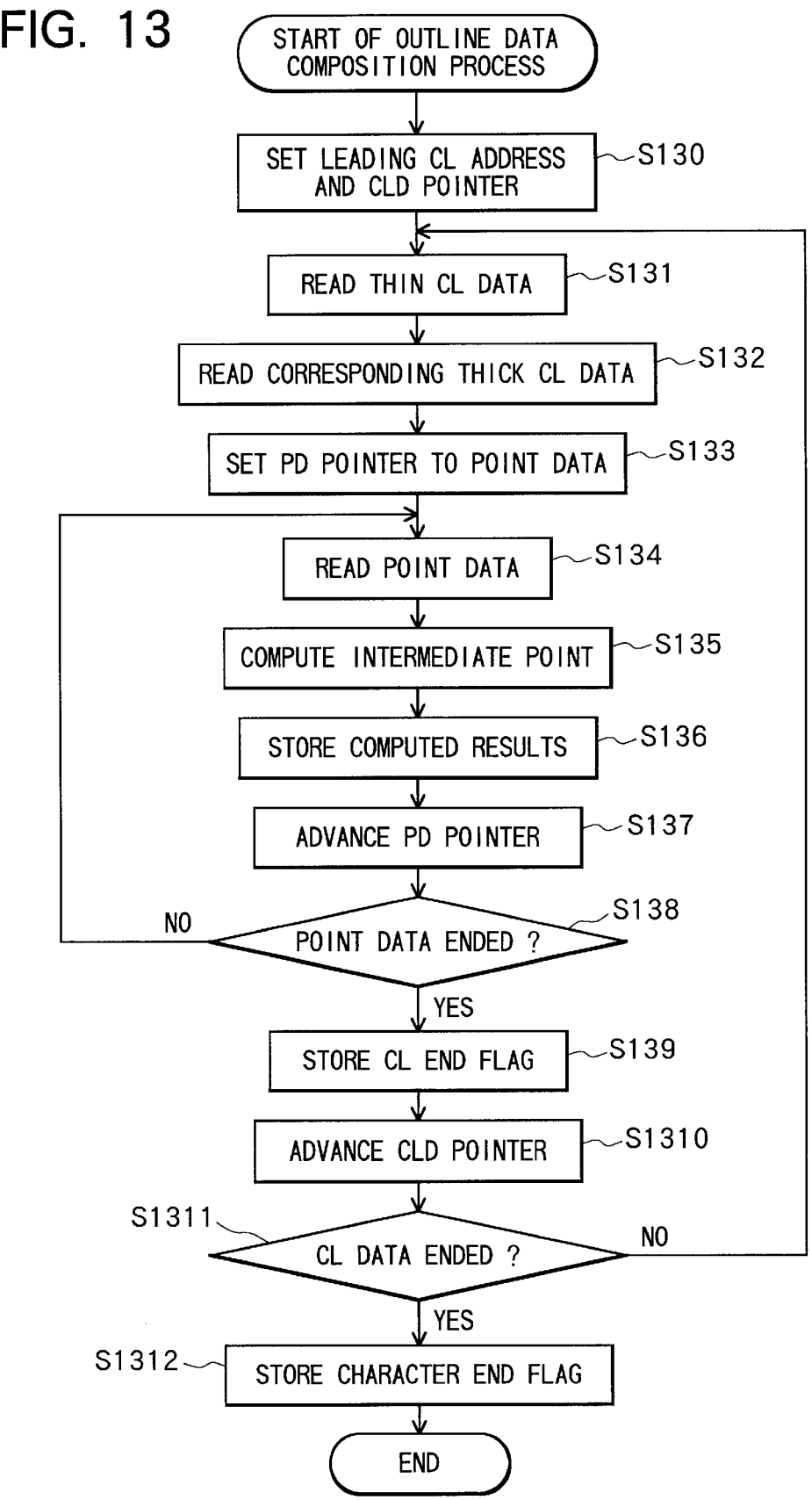
FIG. 13 is a flow chart illustrating processing executed in an outline data composing section.

In the flow chart of FIG. 13, the address of the leading contour line data included in thin line family data are set to both a leading contour line address and contour line data (CLD) pointer in step 130. In step 131, contour line data identified by the address set to the CLD point are read and in step 132, contour line data included in thick line family data and having the same ID number as the contour line data read in step 131 are read. Specifically, two pieces of contour line data representative of the same part of thin and thick line family data are read in steps 131 and 132.

Among many pieces of point data of each of contour line data of thin and thick line family data read in steps 131 and 132, the address of the point with the process leading flag being set is set to both thin line family data pointer and thick line family data pointer in the working memory 26. Specifically, pointers are given which specifies point data addresses representative of the same part of contour line data which are the same part of both the thin and thick line family data.

The processing executed in steps 134 through 138 are repeated until point data included in contour line data are over and the intermediate points between thin and thick line family data are sequentially computed and the resultant data are stored in the outline buffer. Specifically, in step 134, point data are read relying on the addresses specified by the thin line family data pointer and thick line family data pointer in step 134. In step 135, coordinate data of an intermediate point indicated by the weight set in the parameter memory 25 are computed based on coordinate data for point data of both thin line family data and thick line family data. Representing the coordinate value of thin line family data as $P_0$, and the coordinate value of thick line family data as $P_1$ and assuming that weight is set to α (%), the intermediate point P can be computed by the following formula:

$$P=\{1-(\alpha/100)\}P_0+(\alpha/100)P_1$$

Figure 14:
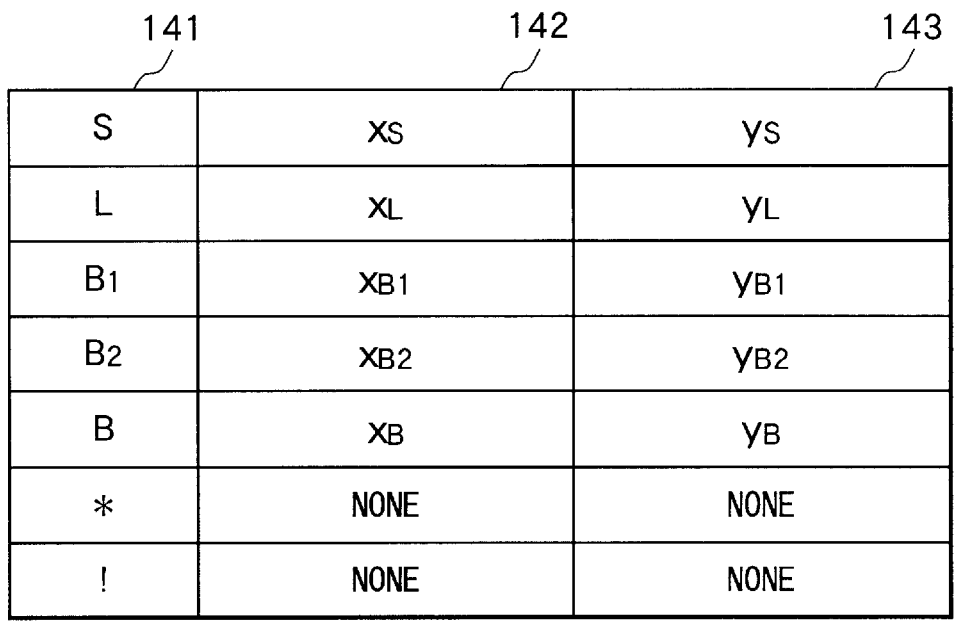
FIG. 14 is a conceptional diagram of a storage format in an outline buffer.

In step 136, the data computed in step 136 are stored in the outline buffer. As shown in FIG. 14, attribute 141, X-coordinate value 142 and Y-coordinate value 143 are stored in the outline buffer. Those shown in Table 1 is used for the attribute 141. Here, the attributes "*" and "!" which are not used in the character ROM 23 are used. The attribute for the point data of thin line family data can be duplicated.

In step 137, next data address of point data of thin line family data is stored in the thin line family data pointer whereas next date address of point data of thick line family data is stored in the thick line family data pointer. In step 138, it is determined that the point data included in contour line data are over. The point data included in contour line data are determined to be over if the process leading flag of point data indicated by the thin line family data pointer is set. If so determined, the routine advances further. If the process leading flag has not been set, the processing in steps 134 through 137 are repeatedly carried out.

If the decision made in step 138 is "YES", the attribute "*" indicating the end of contour line is stored in the outline buffer, because the advancement to step 139 indicates the end of one piece of contour line data. In step 1310, next address of contour line data of thick data is set to the CLD pointer. In step 1311, it is determined that contour line data terminates. When the address of the leading contour line data and the contents of the CLD pointer are in coincidence with each other, it is determined that all pieces of contour line data have been processed. If the decision made in step 1311 is "YES", the character end flag "!" is further stored in the outline buffer in step 1312. If, on the other hand, the decision made in step 1311 is "NO", the processing from steps 131 to step 1310 are repeatedly carried out. With the above processing, the composition of outline data can be achieved.

As described above, according to the laser printer constructed In accordance with the embodiment of the invention, stored are data representative of character shapes in two families of the same font, ID numbers of contour line data representative of correspondence of point data in thin and thick line family data, and process leading flags of point data. Using the ID number and the process leading flag, point data for the same part are derived from both thin and thick line family data Additional family fonts of Times Roman or Helvetica become available using the intermediate point obtained through computation.

Although the present invention has been described in detail with respect to a specific embodiment thereof, it will be appreciated for those skilled in the art that a variety of changes and modifications may be made without departing from the scope and spirit of the invention. For example, while in the above example, two fonts are exemplified, the number of fonts can be increased. Otherwise, either Times Roman or Helvetica can be removed. In the embodiment, while slender and bold family fonts are used to output characters with changed line width or thickness, small size, large size and extremely large size characters may be used to output characters whose width is changed. Further, although ID number and process leading flag of point data are used to provide information for obtaining point data of the same parts of thin and thick line family data, the present invention can be achieved with the use of information obtained from the same parts. The present invention is applicable not only to laser printer but also other types of printers. Further, the invention is applicable to devices other than printers insofar as using character outline data.

What is claimed is:

1. A character/symbol generating device, comprising:

character storage means for storing first character shape data, and second character shape data, the first character shape data specifying a first shape of a character or a symbol and including first identification data for identifying each of a plurality of reference segments making up the first shape of the character or the symbol, the first shape having a height and a width, the second character shape data specifying a second shape of the same character or the same symbol and including second identification data for identifying data for identifying each of a plurality of reference segments making up the second shape of the character or symbol, the second shape having a height and a width that are the same as the height and the width of said first shape, respectively, each reference segment of the first and second shapes defining a solid character or symbol portion and being different only in thickness;

means for reading corresponding reference segments based on common identification data from the first character shape data and the second character shape data;

means for computing a thickness of each one of a plurality of generated segments to be a sum of a first value proportional to a thickness of a corresponding one of the reference segments of the first shape and a second value proportional to a thickness of a corresponding one of the reference segments of the second shape and obtaining a computed thickness of each one of the plurality of generated segments; and means for constructing the generated segments to form a third shape indicating a generated character or a generated symbol based on the computed thickness of the generated segments, whereby the third shape has a height and a width equal to the height and the width of the first shape but is different only in thickness of each one of the plurality of generated segments.

2. The device according to claim 1, further comprising means for reading data of corresponding points of the first and second shapes from the first character shape data and the second character shape data, and wherein said computing means computes an intermediate point between the corresponding points read by said reading means based on the data of corresponding points, wherein said means for constructing is for constructing the third shape based on said intermediate point.

3. The device according to claim 2, wherein said computing means computes the intermediate point based on an instruction from said means for constructing.

4. The device according to claim 2, further comprising second storage means for storing data of the third shape.

5. The device according to claim 2, wherein said character storage means stores coordinate values representing the first character shape data and the second character shape data and wherein said computing means computes the intermediate point based on the coordinate values.

6. The device according to claim 1, wherein the first and second character shape data are in a same font category.

7. The device according to claim 1, wherein the first character shape data includes a first line thickness of the character and the second character shape data includes a second line thickness of the character.

8. The device according to claim 2, wherein said means for constructing comprises means for generating third character shape data representing a third shape of the same character defined by the intermediate point.

9. The device according to claim 8, wherein the computed thickness is between the first line thickness and the second line thickness.

10. A character/symbol generating device, comprising:

character storage means for storing first character shape data, and second character shape data, the first character shape data specifying a first shape of a character or a symbol and including first identification data for identifying each of a plurality of reference segments making up the first shape of the character or the symbol, the first shape having a height and a width, the second character shape data specifying a second shape of the same character or the same symbol and including second identification data for identifying each of a plurality of reference segments making up the second shape of the character or the symbol, the second shape having a height and a width that are same as the height and the width of said first shape, respectively, each reference segment of the first and second shapes defining a solid character or symbol portion and being different only in thickness, each of said first and second character shape data further includes point data defining a closed figure representative of the solid character or symbol portion defined by the reference segment and a next contour line address for identifying a new contour line associated with another reference segment;

means for reading corresponding reference segments based on common identification data from the first character shape data and the second character shape data;

means for computing a proportional thickness of each one of a plurality of generated segments to be a sum of a first value proportional to a thickness of a corresponding one of the reference segments of the first shape and a second value proportional to a thickness of a corresponding one of the reference segments of the second shape and obtaining a computed thickness of each one of the plurality of generated segments; and means for constructing the generated segments to form a third shape indicating a generated character or a generated symbol based on the computed thickness of the generated segments, whereby the third shape has a height and a width equal to the height and the width of the first shape but is different only in thickness of each one of the plurality of generated segments.

11. The device according to claim 10, further comprising means for reading data of corresponding points of the first and second shapes from the first character shape data and the second character shape data and wherein said computing means computes an intermediate point between the corresponding points read by said reading means based on the data of corresponding points, wherein said means for constructing is for constructing the third character shape based on said intermediate point.

12. The device according to claim 11, wherein said computing means computes the intermediate point based on an instruction from said means for constructing.

13. The device according to claim 11, further comprising second storage means for storing data of the third shape.

14. The device according to claim 11, wherein said character storage means stores coordinate values representing the first character shape data and the second character shape data and wherein said computing means computes the intermediate point based on the coordinate values.

15. The device according to claim 11, wherein said means for constructing comprises means for generating third character shape data representing a third shape of the same character defined by the intermediate point.

16. The device according to claim 15, wherein the computed is between the first line thickness and the second line thickness.

17. The device according to claim 10, wherein the first and second character shape data are in a same font category.

18. The device according to claim 10, wherein the first shape data includes a first line thickness of the character and the second character shape data includes a second line thickness of the character.

* * * * *